Sept. 5, 1933. L. J. CONKLING Re. 18,938

FAST BURNING TYPE CANDLE

Original Filed March 30, 1932

INVENTOR.
LESTER J. CONKLING
BY
Semmes & Semmes
ATTORNEYS

Reissued Sept. 5, 1933

Re. 18,938

UNITED STATES PATENT OFFICE 18,938

FAST BURNING TYPE CANDLE

Lester J. Conkling, Edgewood, Md.

Original No. 1,895,149, dated January 24, 1933, Serial No. 602,015, March 30, 1932. Application for reissue May 6, 1933. Serial No. 669,668

33 Claims. (Cl. 102—26)

(Granted under the Act of March 3, 1883, as amended April 30, 1928; 370 O. G. 757)

The invention relates to irritant gas producing devices and more particularly has reference to a fast burning type of grenade or candle.

In general, grenades of this nature heretofore employed have been of the slow burning type. While these grenades are effective in producing a gas cloud of desired volume, because of their slow burning rate, they may be safely picked up and thrown back at the original thrower. Obviously this changes the position of the person attacking to that of the person attacked.

Other defects inherent in grenades employed in the past reside in the fact that they are not ignited the instant they strike the ground nor are they provided with sufficient outlets so distributed on the container for the candle, that the gas generated may be readily and effusively emitted therefrom.

It will hence be apparent that the major object of my invention is to provide a fast burning type of gas producing candle which lacks the inherent disadvantages of similar devices disclosed in the prior art.

An equally important object of the invention is the provision of a grenade loaded with a gas producing filler formed so as to have an enlarged burning area.

Another object of the invention is the provision of a grenade, the gas producing mixture of which is provided with a plurality of grooves or slots extending along its outer surface, from one end thereof to another.

Yet another object of my invention is to provide a container for a gas producing candle provided with rows of openings in the wall of the container extending to the base thereof and provided with openings in the top.

Still another object of my invention is the provision of a quick burning type of candle having a filling which is provided with a plurality of slots extending along its surface, the top surface and slots of the filler being coated with a starter paste.

A further object of the invention is to devise a gas producing grenade including a container for a gas producing mixture or filling, the mixture being provided with a plurality of slots extending along its entire surface adjacent the inner periphery of the container and the container walls being provided with a row of openings adjacent each groove in the mixture and communicating therewith.

A still further object of my invention is the employment with a gas producing grenade of a filling including lacrimating or toxic material or a combination of both which is loaded therein under pressure without the use of heat and a colloiding or binding substance and is so formed as to leave slots extending along the longitudinal surface of the filling.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

As already noted, the invention comprehends the provision of a fast burning type of gas producing candle or grenade. One manner of practically effecting the concept of my invention is the provision of a container for a gas producing mixture or filling. This mixture which includes a fuel and a lacrimatory or toxic compound or both, after mixing without heating and without the use of colloiding or binding substances is loaded into the container under pressure so as to form a cake. To the end that a fast burning filling may be provided the periphery of the mixture cake is provided with a plurality of slots or grooves extending the full length thereof, each groove as well as the top of the cake being coated with a suitable starter substance. Adjacent each groove and cut through the walls of the container is a row of openings for the purpose of allowing the gases generated on ignition of the mixture to be emitted from the grenade.

The invention also includes the provision of a top for the container having a plurality of openings to allow the emission of gases from the grenade, the top being constructed so as to permit the mounting thereon of suitable firing mechanism for igniting the filler in the container.

In order to make my invention more clearly understood, I have shown, in the accompanying drawing, means for carrying the same into practical effect without limiting the improvements in their useful applications to the particular constructions which, for the purposes of explanation, have been made the subject of illustration.

Figure 1:
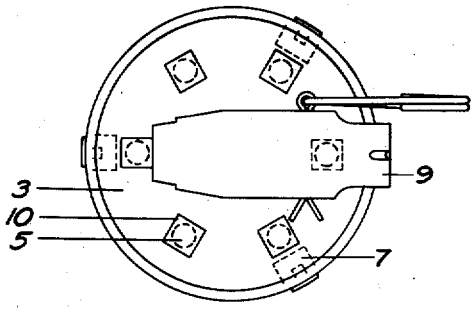
Figure 1 is a top plan of the candle forming the subject matter of my invention.
Figure 2:
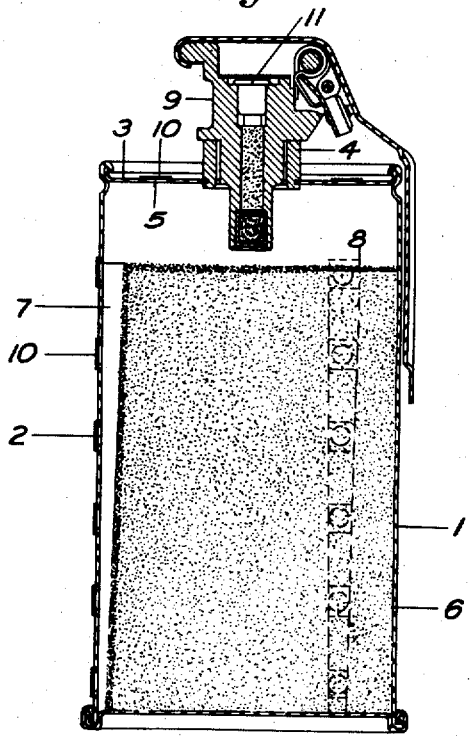
Figure 2 is a detailed longitudinal sectional view of the grenade shown in Figure 1.

Throughout the drawing similar reference numerals refer to like parts in the different views. In Figures 1 and 2, the grenade or candle disclosed comprises a container having a top and base. The container, designated by the reference numeral 1, is provided with a plurality of rows of holes 2 in the walls thereof, three rows of outlets preferably being employed. In addition to the openings 2, provided in the body of the container, it may be noted that the top 3 is also provided with outlets 5 and if found desirable similar openings in the base may be employed. Each opening or outlet in the container is normally covered by strips of adhesive tape 10 though other materials and means for closing the openings prior to the functioning of the grenade may be employed if desired.

Associated with the container and supported upon an adapter 4 carried on the container top 3 is a suitable firing mechanism 9, including the usual firing pin and primer 11. In connection with the firing device 9, it has been found that a bouchon mechanism modified to give a two-second delay functions successfully for the purposes desired. However, I do not wish to limit myself to any particular firing mechanism inasmuch as it will be apparent to those skilled in the art that any device which will ignite the charge within the grenade may be successfully employed.

The container 1 is loaded with a filling 6, placed therein under pressure of approximately forty-seven hundred pounds per square inch. Other loading pressures may, of course, be employed without departing from the scope of my invention. This mixture or filling 6 is so loaded into the container that for each row of outlets 2 a groove or slot 7 is left extending down the entire length of the surface of the filling, each slot being positioned so that it is opposite one of the rows of openings in the container wall.

On the top of the mixture 6 and extending downward through the slots 7 so as to cover their surface, is a layer of starter 8. The firing mechanism 9, as previously noted, is preferably given about a two-second delay between the striking of the primer 11 associated therewith and the ignition of the starter 8. This delay, it should be observed, causes the candle to function about the time it comes to rest on the ground after it has been thrown.

In making these candles a lacrimator or toxic or a combination of both, smokeless powder (preferably a bulk powder) and a stabilizer, such as magnesium oxide are thoroughly mixed and pressed into the container under hydraulic pressure, a smooth firm cake being obtained without the aid of heat or colloiding substances. Suitable gas producing substances are chloracetophenone or diphenylaminechlorarsine or both, the former being commonly called CN, and the latter being known as DM. However, I wish it to be understood that the scope of my disclosure is not limited to the use of these two substances only as other irritant and toxic compounds may readily be employed in forming the gas producing mixture.

The slots or grooves 7 are formed in the mixture at the time of loading by leaving tapered cores extending down inside the container so as to cover the vertical rows of holes. After loading, the cores are removed leaving slots extending down the sides of the mixture so that each row of holes in the container opens into a slot.

Loading of the container having been completed, starter paste is poured over the exposed surface of the filling, care being taken to allow the paste to flow down into the slots. This starter consists of black meal powder and a celluloid-acetone binder. It is to be especially noted that the starter covers the surface of the grooves 7.

If desired a burning hole through the center of the mixture or cake 6 may be provided for the purpose of speeding up the rate of burning of the candle. When making use of such an expedient, the starter is allowed to run down the hole in the center of the mixture cake. However, while the use of a burning hole through the center of a candle results in a shorter time of burning, some decomposition of the chloracetophenone, when used, has been found to take place.

The candle is operated by firing the mechanism which after a delay fires the starter, this in turn igniting the mixture in the candle. As the fuel burns, the lacrimator or toxic or both as the case may be, is or are distilled off and the gases pass out through the openings in the body and the top of the container. The emission of a large volume of gas, in the short time period of approximately 20 to 30 seconds, through the side and top openings prevent this candle from being picked up and thrown back. By reason of these slots or grooves in the sides of the mixture cake, it will be appreciated that the burning area of the mixture is increased and the time rate of burning speeded up.

Furthermore, due to the rapid combustion of the starter substance and the gas emitting cartridge or mass in proximity to the container, the walls of the container very quickly become too hot to handle without burning one's hands. This feature further prevents the picking up and throwing back of my fast burning candle once the burning has started.

For each row of openings in the body of the container, a groove or slot in the surface of the mixture cake positioned so as to be opposite a row of openings is provided. It has been found that a grenade provided with three rows of openings in the container having six holes of ¼ inch diameter in each row with corresponding tapering grooves ⅜ of an inch wide at the top and $\frac{3}{16}$ of an inch wide at the bottom, is highly efficient and satisfactory. In addition to these openings or outlets, six ¼ inch diameter holes are formed in the container top.

Of course, the number and diameter of the openings in each row and in the container top may be varied to a greater or less extent as desired and as mentioned outlets in the base of the container may be added. Likewise, the number of rows of openings in the container body may be varied. Similarly a variation in the cross section and number of grooves in the mixture 7 may be made. Departure from the number and size of the openings and grooves shown is well within the scope of the invention and the spirit of the appended claims. Not only the rate of burning of the mixture will be affected, but also the pressure at which the gas is expelled will vary, which later, it may be found necessary to vary to meet all demands and requirements for particular purposes.

The advantages and quick burning effect of the candle forming the subject matter of my invention may be best appreciated by comparison with experiments conducted with other types of gas-producing grenades.

In the first experiment, a grenade was employed similar to the one shown but provided with a solid cake of gas-producing mixture having a cross sectional area throughout its length equal to the inner diameter of the container, no slots being formed therein. A starter was poured over the top of the mixture and ignition was obtained by means of a bouchon type mechanism giving a two-second delay. Evolution of the gas was through the top of the container, the center of the holes being about ⅜ of an inch below the bend of the container top. In this instance, a very heavy cloud of gas vapors was given off for about one minute.

A second experiment employing a candle like that shown in the present drawing but provided with only one slot 7 and one row of openings 2 having six holes to the row was also made. Outlets in the container top were also provided. The burning time of the mixture was reduced from one minute, noted in the first experiment above, to 40 seconds. Such a time period was short enough to prevent the candle from being picked up by a person so as to allow him to throw it back.

By the use of three slots with a row of openings for each groove in the body of the container, exactly as shown in the present drawing, the burning time of the candle was further reduced, in this instance, to a time period of from 20 to 30 seconds.

Other tests with the candle which I have disclosed to determine the effects obtained from dropping or throwing it on concrete from various heights, showed that when dropped from an elevation of 35 feet, the candle functioned satisfactorily. This distance was increased to 45 feet. Of three candles dropped on concrete from this latter height, two functioned satisfactorily while one exploded, probably due to the breaking up of the mixture on impact. Similarly, two candles dropped on concrete from a height of 80 feet exploded on impact although both candles had started functioning before they struck.

From the foregoing description it may be appreciated that I have devised an efficient candle or grenade having an exceedingly fast burning time resulting in a rapid evolution of gas and the container becoming so hot as to prevent it from being picked up after it has been thrown. By reason of the starting mechanism the candle is ignited on impact and because of the construction of the mixture cake and container, that is to say the grooves in the mixture with the corresponding rows or openings in the container body, a thick gaseous vapor is produced for 20 or 30 seconds. Moreover, from the nature of the fuel employed, and the manner of loading, it may be observed that I have provided a quick burning type of candle which may be readily and easily manufactured.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim

1. In a candle having a container provided with outlets and a firing mechanism, a filling for said container, said filling being provided with a plurality of slots on the surface thereof adjacent the wall of the container body, and a starter substance within said slots.

2. In a candle having a container provided with outlets a filling for said container including a fuel, a lacrimatory and a toxic substance said filling being provided with a plurality of slots on the surface thereof adjacent the wall of the container, a starter substance closely adjacent each slot and means associated with the container for firing the starter to cause ignition of the filling.

3. In a candle having a container provided with outlets, a filling therefor loaded into the container under pressure and in such manner as to provide the sides of said filling adjacent the wall of the container body with a plurality of slots, a starter substance positioned in the slots in said filling, and means associated with the container for firing the starter substance to cause ignition of the filling.

4. In a candle having a container provided with outlets, a filling for the container including a fuel and a substance capable of producing a gas on ignition loaded into the container under pressure, said filling having longitudinal separated areas spaced from said container, a starter substance in said longitudinal areas, and means associated with the container for firing the starter to cause ignition of the filling.

5. In a candle having a container provided with outlets, a filling for the container including a fuel and substances capable of generating a gas on ignition loaded into the container under pressure in such manner as to provide the side of said filling adjacent the wall of the container body with a plurality of slots, a starter substance, adjacent to said slots and on the top of the filling, and means associated with the container for firing the starter substance to cause ignition of the filling.

6. In a candle having a container provided with outlets, a filling therefor including a fuel and chloracetophenone mixed cold and loaded into the container under pressure in such manner as to provide the sides of said filling adjacent the walls of the container body with a plurality of slots, a starter substance coated on the filling within said slots, and means associated with the container for firing the starter substance to cause ignition of the filling.

7. In a candle having a container provided with outlets, a filling therefor including a fuel and diphenylaminechlorarsine mixed cold and loaded into the container under pressure in such manner as to provide the sides of said filling adjacent the wall of the container body with a plurality of slots, a starter substance, each of said slots being coated with said starter substance, and means associated with the container for firing the starter to cause ignition of the filling.

8. In a candle having a container provided with outlets, a filling therefor including a fuel, chloracetophenone, and diphenylaminechlorarsine mixed cold and loaded into the container under pressure in such manner as to provide the sides of said filling adjacent the walls of the container body with a plurality of slots, each of said slots being coated with a starter substance, and means associated with the container for firing the starter substance to cause ignition of the filling.

9. A candle comprising a container, a filling for said container, said filling being provided with a plurality of slots on the surface thereof adjacent the walls of the container body, said container having the wall thereof provided with a plurality of rows of openings, a row of said openings being adjacent and communicating with each slot in the filling, a starter substance within each slot, and means associated with the container for firing said starter substance and igniting the filling.

10. A candle comprising a container, a filling for said container, said filling being provided with a plurality of slots on the surface thereof adjacent the wall of the container body and extending longitudinally of the filling, said container having a top provided with a plurality of openings, the wall of said container body being provided with a plurality of rows of openings, each row extending from the top to the bottom of the container and being adjacent and communicating with a slot in said filling, a starter substance coating each of said slots, and means associated with the container for firing said starter substance and igniting the filling.

11. A candle comprising a container, a filling for said container, said filling being provided with a plurality of slots on the surface thereof adjacent the walls of the container body, said container having a top provided with a plurality of openings, the wall of the container body being provided with a plurality of rows of openings extending from the top to the bottom of said container, each of said rows of openings in the container body being adjacent and communicating with a slot in said filling, each of said slots and the top of said filling being coated with a starter mixture, and means associated with the container for firing said starter substance and igniting the filling.

12. A candle comprising a container, a top and a filling for the container, the filling for the container including a fuel and a substance capable of producing a gas on ignition loaded into the container under pressure in such a manner as to provide the sides of said filling adjacent the walls of the container body with a plurality of slots of a length equal to the filling, said container having a wall of the body thereof provided with a plurality of rows of openings and, the top of said container being also provided with openings, each of said rows of openings in the container body being adjacent and communicating with a slot in said filling, each of said slots and the top of said filling being coated with a starter mixture, and means associated with the container for firing said starter substance and igniting the filling.

13. A candle comprising a container, a top and a filling for the container, the filling for the container including a fuel and substance capable of producing a gas on ignition loaded into the container under pressure in such a manner as to provide the sides of said filling adjacent the walls of the container body with a plurality of slots, said container having a wall of the body thereof provided with a plurality of rows of openings, and the top of said container being also provided with openings, each of said rows of openings in the container body being adjacent and communicating with a slot in said filling, each of said slots and the top of said filling being coated with a starter mixture, and means associated with the container for firing said starter and igniting the filling.

14. A candle comprising a container provided with a plurality of outlets, a filling therefor loaded into said container, said filling being spaced from the wall of said container at a plurality of ignitable areas, a starter substance, said starter substance being positioned in proximity to said areas, and means to ignite said starter substance.

15. In a fast burning candle, an exposed container provided with a plurality of outlets, a filling for said container capable of producing a gas on ignition thereof, said filling being in contact with the major portion of the wall of said container and provided with a longitudinally extending igniting area out of contact with the wall of said container, a starter substance, said starter substance being adjacent said igniting area, and means for firing said starter substance.

16. The invention as defined in claim 15 wherein at least some of the outlets in said container are closely adjacent to and substantially coextensive with said igniting area.

17. In a fast burning candle, a container, a filling for said container including a fuel, said filling being in contact with a substantial portion of the inner wall of said container, and having areas spaced from said inner wall, said container having a group of outlets in communication with the spaces provided by each of said areas, a starter substance in said container, and means for firing said starter substance.

18. In a fast burning device of the class described, a container, a combustible filling conforming substantially to the inner surface of said container and having a longitudinally extending combustible area spaced from the wall of said container, said container having a plurality of openings substantially coextensive with said area and in alignment therewith, a starter substance in said container, and means for firing said starter substance.

19. In a fast burning device of the class described, a container, a combustible filling therein spaced from the top of said container and conforming substantially to the inner surface of the lower portion of said container, said filling having a plurality of longitudinal combustible areas spaced from the wall of said container, a starter substance on top of said filling, and means for firing said starter substance.

20. In a fast burning candle, a container having a plurality of groups of outlets, destructible closures over said outlets, a combustible filling for said container capable of producing a gas on ignition, said filling having a plurality of combustible areas spaced from the container each in alignment with one group of outlets, and a starter substance to ignite said filling.

21. In a fast burning candle, a container provided with a plurality of outlets, a combustible filling in said container in contact with a substantial portion of the inner surface of said container, but spaced therefrom to provide a longitudinal ignitible area on the periphery of said filling, a starter substance closely adjacent said ignitible area, and means to ignite said starter substance.

22. In a fast burning candle, a container having a plurality of groups of outlets, a combustible filling for said container in contact with the imperforate inner surface of said container, said filling having a plurality of separate ignitible areas on the periphery thereof each in alignment with a group of outlets, and a starter substance adjacent each ignitible area.

23. In a fast burning candle, a container, a combustible filling therefor spaced from the top of said container, said filling having a plurality of longitudinally extending grooves in its periphery to provide ignitible areas spaced from the wall of said container, said grooves communicating with the space above said filling, a plurality of outlets in alignment with each groove, and a starter substance on top of said filling.

24. A fast burning candle comprising a container having top, bottom, and side walls, a combustible gas emitting cartridge in said container, said cartridge having a rapid combustion area spaced from the side wall of said container, a starter substance within said container and in combustible relation to said rapid combustion area, the wall of said container having a plurality of openings in proximate relation to said area whereby rapid combustion and omission of gas through said openings takes place, and means for firing said starter substance.

25. A fast burning candle adapted to be thrown by an operator and so constructed that it can not be picked up and thrown after firing comprising a container having top, bottom and side walls, a combustible gas emitting cartridge within the container, said cartridge having a rapid combustion area spaced from the side wall of said container, a starter substance within said container and in substantial contact with at least a portion of said area, said container having a plurality of openings in its side wall in proximate relation to said area whereby rapid combustion and emission of gas through said openings takes place, and means for firing said starter substance.

26. A fast burning candle adapted to be thrown and so constructed that it cannot be picked up and thrown after firing, comprising a container having top, bottom and side walls, a combustible gas emitting cartridge within said container, said cartridge having rapid combustion areas spaced from the top of said container and from the side wall thereof, said areas being in communication, a starter substance on said areas, said container having a plurality of temporarily sealed outlets in the side wall thereof whereby rapid combustion and emission of gas takes place upon firing, and means to fire said starter substance.

27. The invention as defined in claim 26 wherein the means to fire said starter substance is in proximate relation to the area spaced from the top of said container whereby ignition occurs first at this area and then rapidly proceeds down the side of said cartridge.

28. The invention as defined in claim 26 wherein the means to fire said starter substance is in firing relation to one of said areas, combustion then proceeding rapidly to another area.

29. In a fast burning device of the class described, a container, a combustible mass within said container and having a longitudinally extending combustible area spaced from the wall of said container, said container having a plurality of openings provided with destructible seals, said openings located longitudinally on the body of said container and in operative relation to portions of said combustible area, a starter substance in said container, and means for firing said starter substance.

30. In a fast burning candle, a container having a plurality of groups of outlets, destructible closures over said outlets, a combustible mass in said container capable of producing a gas on ignition, said mass having a plurality of combustible areas, said areas spaced from the container and in operative relation with said outlets, and a starter substance to ignite the said filling.

31. A fast burning candle comprising a container having a side wall and top and bottom closures, a combustible gas emitting mass in the container, said mass being provided with a combustible area spaced from and out of contact with the surface of the side wall of the container, a starter substance covering the said combustible area, the side wall of said container having a plurality of openings in proximate relation to the said combustible area whereby rapid combustion and emission of gas takes place proximate to said openings and rapidly escapes therethrough, and means for firing said starter substance.

32. In a fast burning candle, a container having a plurality of groups of outlets, destructible closures over said outlets, a combustible charge for said container capable of producing a gas on ignition, said charge having a plurality of combustible areas spaced from the container, some of said areas in alignment with said groups of outlets, and a starter substance to ignite said combustible charge.

33. In a fast burning candle, a container having a plurality of groups of outlets, destructible closures over said outlets, a combustible charge for said container capable of producing a gas on ignition, said charge having a plurality of combustible areas spaced from the container, some of said areas in proximity to said groups of outlets, and a starter substance to ignite said combustible charge.

LESTER J. CONKLING.